3,081,318
4-ANDROSTENE-2α,3,17β-TRIOLS
AND PREPARATION THEREOF
Robert L. Clarke, Bethlehem, N.Y., assignor to Sterling Drug Inc., New York, N.Y., a corporation of Delaware
No Drawing. Filed Nov. 18, 1959, Ser. No. 853,679
7 Claims. (Cl. 260—397.5)

This invention relates to steroid triols and in particular is concerned with 4-androstene-2α,3,17β-triols and the preparation thereof.

The compounds of the invention have the structural formulas:

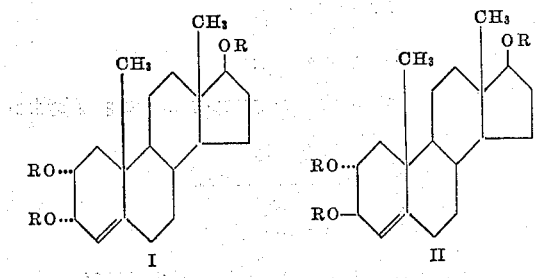

I          II wherein R represents hydrogen or a carboxylic acyl radical.

When R in the above structural formulas represents carboxylic acyl, it stands for carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

The compounds of the invention are prepared by reduction of the known 2α,17β-dihydroxy-4-androsten-3-one [Clarke et al., J. Am. Chem. Soc. 77, 661–4 (1955)] with lithium aluminum hydride. The reduction takes place readily at room temperature in an inert, anhydrous solvent such as ether, petroleum ether, benzene, or the like. The product is isolated by hydrolysis and extraction, and separated into the two $C_3$-epimers, 4-androstene-2α,3α,17β-triol (I; R=H) and 4-androstene-2α,3β,17β-triol (II; R=H) by fractional crystallization. Triesters of the two triols are prepared by conventional procedures by reacting them with the appropriate acid anhydride or acid halide.

The structures of the compounds of the invention were established by the method of preparation, by elementary analysis and by the method of optical rotatory differences. Conversions of 2α-hydroxy-4-cholesten-3-one acetate to 4-cholestene-2α,3β-diol diacetate is accompanied by a molecular rotational change ($\Delta M_D$) of $-585°$. The analogous conversion in the present series, 2α,17β-dihydroxy-4-androsten-3-one diacetate to the epimeric 4-androstene-2α,3,17β-triol triacetates, involves molecular rotational changes of $+302°$ and $-605°$. The triacetate which showed the $-605°$ change, namely the one melting at 151.2–153.2° C., was assigned the 2α,3β,17β-configuration. In further support of the above structural assignments, conversion of 4-cholestene-2α,3β-diol to its diacetate is accompanied by a $\Delta M_D$ of $-448°$. Analogously, conversion of 4-androstene-2α,3β,17β-triol to its triacetate involves a $\Delta M_D$ of $-422°$ which, when modified by a $\Delta M_D$ of $-30°$ due to the esterification of the 17β-hydroxy group, gives a corrected value of $-392°$. On the other hand, conversion of the 4-androstene-2α,3α,17β-triol to its triacetate involves a $\Delta M_D$ of $-91°$ which, when modified for the $C_{17}$ esterification, gives a corrected value of $-61°$.

Endocrinological studies of the compounds of the invention have shown that they possess useful metabolic, hormonal and antihormonal properties. In particular, they exhibit anabolic and estrogen-inhibiting activities. They can be prepared for use by dispersing them in an aqueous suspension or by dissolving them in a pharmacologically acceptable oil or oil-water emulsion for parenteral administration; or by incorporation in tablet form with excipients for oral administration.

The following examples will illustrate the invention without the latter being limited thereby.

EXAMPLE 1

*Reduction of 2α,17β-dihydroxy-4-androsten-3-one.*—A solution of 1.17 g. (0.0038 mole) of 2α,17β-dihydroxy-4-androsten-3-one in 300 ml. of ether was added to a solution of 1.3 g. of lithium aluminum hydride in 200 ml. of ether, and the mixture was stirred for fifteen minutes. The reaction mixture was then poured into 2 N hydrochloric acid, the layers were separated, and the water layer was extracted once with ether. The combined ether solutions were washed with water and sodium bicarbonate solution and dried over anhydrous sodium sulfate. The residue from evaporation of the solvent was dissolved in 50 ml. of hot acetone and the solution was chilled. The solid which separated was recrystallized from acetone to give 123 mg. of 4-androstene-2α,3α,17β-triol in the form of colorless needles, M.P. 248.8–251.9° C. (corr.), $[\alpha]_D^{24.2}=+246.9°\pm0.6°$ (1% in 95% ethanol), $M_D^{24.2}=+756°$.

*Analysis.*—Calcd. for $C_{19}H_{30}O_3$: C, 74.5; H, 9.9. Found: C, 74.5; H, 9.8.

The mother liquors from the crystallization of 4-androstene-2α,3α,17β-triol obtained above were concentrated to a 15 ml. volume and allow to stand at 25° C. The solid product which separated was collected and recrystallized from acetone to give 142 mg. of 4-androstene-2α,3β,17β-triol in the form of heavy needle clusters, M.P. 199.9–201.2° C. (corr.), $[\alpha]_D^{24.2}=+26.3°\pm0.7°$ (1% in 95% ethanol), $M_D^{24.2}=+80.4°$.

*Analysis.*—Calcd. for $C_{19}H_{30}O_3$: C, 74.5; H, 9.9. Found: C, 74.5; H, 9.6.

EXAMPLE 2

*2α,3α,17β-triacetoxy-4-androstene.*—A mixture of 0.68 g. of 4-androstene-2α,3α,17β-triol and 5 ml. of acetic anhydride was heated on a steam bath for three and one-half hours. The product was isolated and recrystallized from ether to give 0.64 g. of 2α,3α,17β-triacetoxy-4-androstene in the form of colorless needles, M.P. 175.2–179.2° C. (corr.), $[\alpha]_D^{25}=+153.5°\pm0.2°$ (1% in 95% ethanol), $M_D^{25}=+665°$.

*Analysis.*—Calcd. for $C_{25}H_{36}O_6$: C, 69.4; H, 8.4. Found: C, 69.2; H, 8.5.

By replacing the acetic anhydride in the foregoing example by a molar equivalent amount of butyric anhydride, octanoyl chloride, trimethylacetyl chloride, succinic anhydride, β-cyclopentylpropionyl chloride, benzoyl chloride, p-nitrobenzoyl chloride, phenylacetyl chloride, cinnamoyl chloride, p-chlorophenoxyacetic anhydride, 3,4,5-trimethoxybenzoyl chloride, or a mixture of acetic anhydride and formic acid, there can be obtained, respectively, 2α,3α,17β-butyryloxy-4-androstene, 2α,3α,17β-octanoyloxy-4-androstene, 2α,3α,17β - trimethylacetoxy-4-androstene, 2α,3α,17β-tris(β-carboxypropionoxy)-4-androstene, 2α,3α,17β-tris(β-cyclopentylpropionoxy)-4-androstene, 2α,3α,17β-tribenzoyloxy-4-androstene, 2α,3α,17β-tris(p-nitrobenzoyloxy)-4-androstene, 2α,3α,17β-tris(phenylacetoxy)-4-androstene, 2α,3α,17β - tricinnamoyloxy-4-androstene, 2α,3α,17β - tris(p - chlorophenoxyacetoxy)-4-androstene, 2α,3α,17β-tris(3,4,5-trimethoxybenzoyloxy)-4-androstene, or 2α,3α,17β-triformoxy-4-androstene.

EXAMPLE 3

*2α,3β,17β-triacetoxy-4-androstene.*—A mixture of 1.88 g. of 4-androstene-2α,3β,17β-triol and 15 ml. of acetic anhydride was heated on a steam bath for four hours. The product was isolated and chromatographed on 70 g. of silica gel. A 1:4 ether-pentane mixture eluted 1.22 g. of 2α,3β,17β-triacetoxy-4-androstene in the form of massive prisms which, when twice recrystallized from methanol, melted at 151.2–153.2° C. (corr.), $$[\alpha]_D^{25} = -79.0° \pm 0.2°$$

(1% in 95% ethanol), $M_D^{25} = -342°$.

*Analysis.*—Calcd. for $C_{25}H_{36}O_6$: C, 69.4; H, 8.4. Found: C, 69.1; H, 8.4.

I claim:
1. A member of the group consisting of 4-androstene-2α,3,17β-triol and carboxylic acyl esters thereof.

2. A compound having the formula

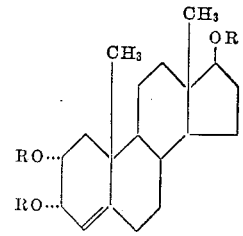

wherein R is selected from the group consisting of hydrogen and carboxylic acyl.

3. A compound having the formula

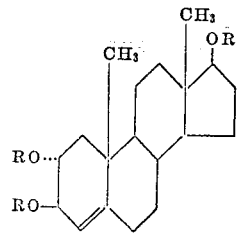

wherein R is selected from the group consisting of hydrogen and carboxylic acyl.

4. 4-androstene-2α,3α,17β-triol.
5. 2α,3α,17β-triacetoxy-4-androstene.
6. 4-androstene-2α,3β,17β-triol.
7. 2α,3β,17β-triacetoxy-4-androstene.

References Cited in the file of this patent
UNITED STATES PATENTS

| | | |
|---|---|---|
| 2,843,608 | Colton | July 15, 1958 |
| 2,846,451 | Sondheimer et al. | Aug. 5, 1958 |